United States Patent
Johnson et al.

(10) Patent No.: US 11,000,953 B2
(45) Date of Patent: May 11, 2021

(54) ROBOT GAMIFICATION FOR IMPROVEMENT OF OPERATOR PERFORMANCE

(71) Applicant: Locus Robotics Corp., Wilmington, MA (US)

(72) Inventors: Michael Charles Johnson, Ashland, MA (US); Sean Johnson, Danvers, MA (US); Luis Jaquez, Burlington, MA (US); Bruce Welty, Boston, MA (US); Karen Leavitt, Sudbury, MA (US)

(73) Assignee: Locus Robotics Corp., Wilmington, MA (US)

( * ) Notice: Subject to any disclaimer, the term of this patent is extended or adjusted under 35 U.S.C. 154(b) by 180 days.

(21) Appl. No.: 16/252,856

(22) Filed: Jan. 21, 2019

(65) Prior Publication Data

US 2019/0217478 A1    Jul. 18, 2019

Related U.S. Application Data

(63) Continuation-in-part of application No. 15/239,133, filed on Aug. 17, 2016, now Pat. No. 10,354,214.

(51) Int. Cl.
*B25J 9/16* (2006.01)
*G06Q 10/06* (2012.01)
(Continued)

(52) U.S. Cl.
CPC ............ *B25J 9/1697* (2013.01); *B25J 9/162* (2013.01); *B25J 9/1679* (2013.01);
(Continued)

(58) Field of Classification Search
CPC ........ B66F 9/063; B66F 9/0755; B66F 9/061; B66F 9/24; B60L 2260/28; B65G 1/1373;
(Continued)

(56) References Cited

U.S. PATENT DOCUMENTS 4,722,053 A * 1/1988 Dubno ................. G06Q 10/087
186/38
5,875,108 A * 2/1999 Hoffberg .......... H04N 21/42201
700/17
(Continued)

FOREIGN PATENT DOCUMENTS

JP   H07-254024 A   10/1995
JP   2003-321106 A   4/2002
(Continued)

OTHER PUBLICATIONS

International Search Report with Written Opinion, dated Apr. 14, 2020, received in international patent application No. PCT/US2020/014243, 13 pages.
(Continued)

*Primary Examiner* — Bhavesh V Amin
(74) *Attorney, Agent, or Firm* — Sunstein LLP

(57) ABSTRACT

Methods and systems are provided for improving operator performance by robot gamification, the method including parking a robot at a pose location within a navigational space, identifying, by a sensor in electronic communication with an interactive display device, an operator located within a zone proximate the robot for acquiring an item to be picked, receiving, at the interactive display device, operator performance data associated with the acquiring of the item, and rendering, on the interactive display device in response to the received operator performance data, at least one graphic representation of operator achievement within a gamified performance tracking environment.

15 Claims, 14 Drawing Sheets

(51) Int. Cl.
*G06K 9/00* (2006.01)
*H04W 4/80* (2018.01)

(52) U.S. Cl.
CPC ... *G06K 9/00288* (2013.01); *G06Q 10/06395* (2013.01); *G06Q 10/06398* (2013.01); *H04W 4/80* (2018.02)

(58) Field of Classification Search
CPC .......................... B65G 1/1378; B65G 1/1375; B65G 2209/04; B65G 2209/06; B65G 2209/08; B65G 1/137; G05B 19/41895; G05B 2219/31007; G05B 2219/40298; G05B 2219/40463; G06Q 10/08; G06Q 50/28; G06Q 10/087; G06Q 10/083; G06Q 10/00; G06Q 10/06; G06Q 30/00; G06Q 20/209; G06Q 20/327; G06Q 20/3274; G06Q 20/3276; G06Q 20/3829; G06Q 20/40145; Y02P 90/285; Y02P 90/60; Y02P 90/02; Y10S 901/01; Y10S 707/99948; H04W 24/02; H04W 24/10; G05D 1/0225; G05D 1/024; G05D 1/0255; G05D 1/0274; G05D 1/0246; G05D 1/0278; G05D 2201/0216; Y10T 408/885; B25J 9/0006; B25J 9/16; B25J 9/1697; B64C 2201/108; B64C 2201/128; B64C 2201/145; B64C 2201/146; B64C 39/024; B64C 39/026; G06F 17/148; G06F 1/163; G06K 9/00013; G07F 17/12; G11B 15/6835; G11B 17/225
See application file for complete search history.

(56) References Cited

U.S. PATENT DOCUMENTS

| | | | | |
|---|---|---|---|---|
| 5,956,465 A * | 9/1999 | Takagi | ............ | G05B 19/41815 700/255 |
| 6,778,092 B2 * | 8/2004 | Braune | ................... | F16P 3/144 250/221 |
| 6,895,305 B2 * | 5/2005 | Lathan | .................... | G06F 3/011 700/245 |
| 7,031,801 B1 | 4/2006 | Hodge et al. | | |
| 7,031,802 B2 | 4/2006 | Bash et al. | | |
| 7,243,001 B2 | 7/2007 | Janert et al. | | |
| 7,607,440 B2 * | 10/2009 | Coste-Maniere | ...... | A61B 34/70 128/898 |
| 7,623,031 B2 * | 11/2009 | Haberer | ................... | F16P 3/144 340/540 |
| 7,652,238 B2 * | 1/2010 | Haberer | ................... | F16P 3/147 250/206.1 |
| 7,778,732 B2 * | 8/2010 | Adachi | ................... | B25J 9/0003 700/245 |
| 8,055,377 B2 | 11/2011 | Yair et al. | | |
| 8,315,735 B2 * | 11/2012 | Nihei | ................... | B25J 9/1676 700/245 |
| 8,571,915 B1 | 10/2013 | Wong et al. | | |
| 8,600,551 B2 * | 12/2013 | Itkowitz | ................. | A61B 34/77 700/245 |
| 8,839,132 B2 | 9/2014 | Reichert | | |
| 9,043,025 B2 * | 5/2015 | Brooks | ................... | B25J 9/1676 700/255 |
| 9,125,788 B2 * | 9/2015 | Tee | ............ | A61H 1/02 |
| 9,126,334 B2 * | 9/2015 | Nakamura | ............... | B25J 19/06 |
| 9,333,652 B2 * | 5/2016 | Hu | ........................ | B25J 9/1697 |
| 9,346,620 B2 | 5/2016 | Brunner et al. | | |
| 9,393,695 B2 * | 7/2016 | Scott | ...................... | B25J 9/1694 |
| 9,452,531 B2 * | 9/2016 | Kikkeri | ................. | G06T 7/20 |
| 9,463,927 B1 | 10/2016 | Theobald | | |
| 9,475,200 B2 * | 10/2016 | Schlaich | ................. | B25J 9/1674 |
| 9,489,730 B2 * | 11/2016 | Doettling | ............. | G06T 7/0004 |
| 9,498,885 B2 * | 11/2016 | Scott | ...................... | G05B 15/02 |
| 9,760,685 B2 * | 9/2017 | Poling | .................... | G06Q 10/06 |
| 9,990,856 B2 * | 6/2018 | Kuchenbecker | ......... | G09B 5/00 |
| 10,325,461 B1 * | 6/2019 | Roberts | ................ | G08B 13/196 |
| 10,380,910 B2 * | 8/2019 | Wu | ........................ | G09B 19/00 |
| 10,452,939 B2 * | 10/2019 | Tani | ...................... | G06K 9/3233 |
| 10,510,267 B2 * | 12/2019 | Jarc | ....................... | G09B 23/285 |
| 10,695,919 B2 * | 6/2020 | Naito | ...................... | B25J 9/1602 |
| 2001/0020675 A1 * | 9/2001 | Tubel | ...................... | E21B 47/07 250/227.11 |
| 2002/0059075 A1 * | 5/2002 | Schick | ................ | B61L 27/0094 701/31.4 |
| 2002/0082087 A1 * | 6/2002 | Kuroda | .................. | A63F 13/71 463/42 |
| 2002/0116388 A1 * | 8/2002 | Clement | ................ | G06Q 10/10 |
| 2002/0120362 A1 * | 8/2002 | Lathan | .................... | B25J 13/08 700/245 |
| 2002/0186299 A1 * | 12/2002 | Cofer | ...................... | F16P 3/142 348/152 |
| 2003/0109780 A1 * | 6/2003 | Coste-Maniere | ...... | B25J 9/1671 600/407 |
| 2004/0036623 A1 * | 2/2004 | Chung | ................ | G06K 7/10336 340/8.1 |
| 2004/0039483 A1 * | 2/2004 | Kemp | ................ | G05B 13/0265 700/245 |
| 2004/0148039 A1 * | 7/2004 | Farchmin | ............. | G05B 19/122 700/79 |
| 2004/0151347 A1 * | 8/2004 | Wisniewski | ....... | G06K 9/00275 382/115 |
| 2005/0027479 A1 * | 2/2005 | Lee | ........................ | B25J 9/1674 702/182 |
| 2005/0119040 A1 * | 6/2005 | Berman | ............... | G07F 17/3244 463/16 |
| 2005/0154594 A1 * | 7/2005 | Beck | ...................... | G09B 19/04 704/276 |
| 2005/0207618 A1 * | 9/2005 | Wohler | ................... | B25J 19/06 382/103 |
| 2006/0049939 A1 * | 3/2006 | Haberer | .................. | F16P 3/142 340/541 |
| 2006/0200253 A1 * | 9/2006 | Hoffberg | ................ | G05B 15/02 700/19 |
| 2008/0021597 A1 * | 1/2008 | Merte | ...................... | F16P 3/147 700/255 |
| 2008/0085499 A1 * | 4/2008 | Horvath | ................ | G09B 23/285 434/262 |
| 2008/0108022 A1 * | 5/2008 | Freund | ................... | G09B 19/167 434/69 |
| 2009/0015663 A1 * | 1/2009 | Doettling | ............ | H04N 13/204 348/46 |
| 2009/0132088 A1 * | 5/2009 | Taitier | ...................... | B25J 13/02 700/264 |
| 2009/0177323 A1 * | 7/2009 | Ziegler | ...................... | G05D 1/0272 700/259 |
| 2009/0222134 A1 * | 9/2009 | Franke | ................ | G05B 19/4061 700/251 |
| 2009/0237499 A1 * | 9/2009 | Kressel | ................... | F16P 3/142 348/77 |
| 2009/0271036 A1 * | 10/2009 | Kock | ...................... | B25J 9/1666 700/245 |
| 2010/0179453 A1 * | 7/2010 | Schweighofer | ...... | A61B 5/1122 600/595 |
| 2010/0179690 A1 * | 7/2010 | Matthias | ................ | B25J 9/1676 700/253 |
| 2010/0191372 A1 * | 7/2010 | Nihei | ...................... | B25J 9/1676 700/245 |
| 2010/0198365 A1 * | 8/2010 | Kawabata | ............. | G01S 7/4817 700/12 |
| 2010/0234857 A1 * | 9/2010 | Itkowitz | .................. | A61B 34/77 606/130 |
| 2010/0296908 A1 | 11/2010 | Ko | | |
| 2011/0200420 A1 | 8/2011 | Driskill et al. | | |
| 2011/0264266 A1 * | 10/2011 | Kock | ...................... | B25J 9/1676 700/253 |
| 2011/0276396 A1 * | 11/2011 | Rathod | ................... | H04L 51/066 705/14.49 |
| 2012/0022689 A1 * | 1/2012 | Kapoor | ................... | B25J 9/1666 700/255 |

(56) References Cited

U.S. PATENT DOCUMENTS

| | | | | |
|---|---|---|---|---|
| 2012/0041593 | A1* | 2/2012 | Ichinose | B66B 1/2458 700/258 |
| 2012/0143104 | A1* | 6/2012 | Tee | A61H 1/02 601/23 |
| 2012/0146789 | A1* | 6/2012 | De Luca | H04N 3/38 340/540 |
| 2012/0296579 | A1* | 11/2012 | Poling | G06Q 10/06 702/50 |
| 2012/0303160 | A1* | 11/2012 | Ziegler | G16H 70/40 700/259 |
| 2012/0330458 | A1 | 12/2012 | Weiss | |
| 2013/0164715 | A1* | 6/2013 | Hunt | G01S 19/13 434/65 |
| 2013/0209980 | A1* | 8/2013 | Kuchenbecker | G09B 23/285 434/262 |
| 2013/0317642 | A1 | 11/2013 | Asaria et al. | |
| 2014/0067121 | A1* | 3/2014 | Brooks | B25J 9/1676 700/255 |
| 2014/0107833 | A1 | 4/2014 | Segawa et al. | |
| 2014/0146648 | A1* | 5/2014 | Alber | G06F 11/0727 369/53.1 |
| 2014/0178161 | A1* | 6/2014 | Moosburger | B65G 1/1378 414/273 |
| 2014/0254896 | A1 | 9/2014 | Zhou et al. | |
| 2014/0263227 | A1* | 9/2014 | Daniel | B23K 9/1043 219/130.01 |
| 2014/0277691 | A1 | 9/2014 | Jacobus et al. | |
| 2014/0309782 | A1* | 10/2014 | Sharpe | G01N 15/1484 700/266 |
| 2015/0004577 | A1* | 1/2015 | Wu | G09B 19/00 434/236 |
| 2015/0025549 | A1* | 1/2015 | Kilroy | A61B 34/37 606/130 |
| 2015/0049911 | A1* | 2/2015 | Doettling | G06T 7/285 382/103 |
| 2015/0217455 | A1* | 8/2015 | Kikkeri | G06T 7/20 700/259 |
| 2015/0275551 | A1* | 10/2015 | Rink | E05B 47/0038 70/263 |
| 2015/0338917 | A1* | 11/2015 | Steiner | A61B 5/316 345/156 |
| 2016/0199140 | A1* | 7/2016 | Gombert | A61B 1/0016 606/130 |
| 2016/0311115 | A1* | 10/2016 | Hill | G06T 19/006 |
| 2017/0029214 | A1 | 2/2017 | Johnson et al. | |
| 2017/0032306 | A1* | 2/2017 | Johnson | G06Q 30/0635 |
| 2017/0049517 | A1* | 2/2017 | Felder | A61B 34/30 |
| 2018/0033276 | A1* | 2/2018 | Whelan | G08B 21/02 |
| 2018/0059635 | A1 | 3/2018 | Johnson et al. | |
| 2018/0222052 | A1* | 8/2018 | Vu | B25J 9/1666 |
| 2018/0229379 | A1* | 8/2018 | Naito | B25J 13/084 |
| 2018/0232593 | A1* | 8/2018 | Tani | B25J 19/06 |
| 2019/0366558 | A1* | 12/2019 | Gupta | B25J 11/0005 |

FOREIGN PATENT DOCUMENTS

| | | |
|---|---|---|
| WO | 2006/076283 A1 | 7/2006 |
| WO | WO 2008/074008 A2 | 6/2008 |

OTHER PUBLICATIONS

Japanese Patent Office—Office Action in JP App. No. 2018-525539 (machine translated), dated Feb. 1, 2019.

* cited by examiner

| Fiducial ID | x | y | z | quaternion.x | quaternion.y | quaternion.z | quaternion.w |
|---|---|---|---|---|---|---|---|
| 1 | -10.2 | 2.3 | 0 | 0 | 0 | 0 | 1 |
| 2 | 23.1 | 15.8 | 0 | 0 | 0 | 0 | 1 |
| 3 | 45.3 | 3.3 | 0 | 0 | 0 | -1 | 0 |

| Location | Fiducial ID |
|---|---|
| L01001A | 11 |
| L01001B | 11 |
| L01001C | 11 |
| L01001D | 11 |
| L01001E | 11 |
| L01001F | 11 |
| L01002A | 12 |
| L01002B | 12 |
| L01002C | 12 |
| L01002D | 12 |
| L01002E | 12 |
| L01003A | 13 |
| L01003B | 13 |
| L01003C | 13 |
| L01003D | 13 |
| L01003E | 13 |
| L01003F | 13 |
| L01004A | 14 |
| L01004B | 14 |
| L01004C | 14 |
| L01004D | 14 |
| L01004E | 14 |
| L01005A | 15 |
| L01005B | 15 |
| L01005C | 15 |
| L01005D | 15 |
| L01005E | 15 |
| L01005F | 15 |

FIG. 7

ROBOT GAMIFICATION FOR IMPROVEMENT OF OPERATOR PERFORMANCE

CROSS-REFERENCE TO RELATED APPLICATIONS

This application is a continuation-in-part of U.S. application Ser. No. 15/239,133, filed Aug. 17, 2016, entitled "OPERATOR ROBOT INTERACTION USING OPERATOR INTERACTION PREFERENCES", which is a continuation of U.S. application Ser. No. 14/815,110, filed Jul. 31, 2015, now U.S. patent. Ser. No. 10/198,706 granted on Feb. 5, 2019, entitled "OPERATOR IDENTIFICATION AND PERFORMANCE TRACKING"; the contents of both above-named applications are incorporated herein by reference.

FIELD OF THE INVENTION

This invention relates to robot gamification and more particularly to robot gamification for improvement of operator performance.

BACKGROUND OF THE INVENTION

Ordering products over the internet for home delivery is an extremely popular way of shopping. Fulfilling such orders in a timely, accurate and efficient manner is logistically challenging to say the least. Clicking the "check out" button in a virtual shopping cart creates an "order." The order includes a listing of items that are to be shipped to a particular address. The process of "fulfillment" involves physically taking or "picking" these items from a large warehouse, packing them, and shipping them to the designated address. An important goal of the order-fulfillment process is thus to ship as many items in as short a time as possible.

The order-fulfillment process typically takes place in a large warehouse that contains many products, including those listed in the order. Among the tasks of order fulfillment is therefore that of traversing the warehouse to find and collect the various items listed in an order. In addition, the products that will ultimately be shipped first need to be received in the warehouse and stored or "placed" in storage bins in an orderly fashion throughout the warehouse so they can be readily retrieved for shipping.

In a large warehouse, the goods that are being delivered and ordered can be stored in the warehouse very far apart from each other and dispersed among a great number of other goods. With an order-fulfillment process using only human operators to place and pick the goods requires the operators to do a great deal of walking and can be inefficient and time consuming. Since the efficiency of the fulfillment process is a function of the number of items shipped per unit time, increasing time reduces efficiency.

Furthermore, due to the repetitive, high paced nature of warehouse picking, human operators can be susceptible to boredom, cognitive disengagement, fatigue, and haste-induced error. All of these symptoms can lead to further reduced efficiency in pick fulfillment.

BRIEF SUMMARY OF THE INVENTION

In order to increase picking efficiency, robots may be used to perform functions of humans or they may be used to supplement the humans' activities. For example, robots may be assigned to "place" a number of items in various locations dispersed throughout the warehouse or to "pick" items from various locations for packing and shipping. The picking and placing may be done by the robot alone or with the assistance of human operators. For example, in the case of a pick operation, the human operator would pick items from shelves and place them on the robots or, in the case of a place operation, the human operator would pick items from the robot and place them on the shelves.

As explained above, such efficiencies can be reduced or threatened should the human operators succumb to efficiency-reducing behaviors such as boredom, cognitive disengagement, fatigue, and haste-induced error. Accordingly, active management of human operator engagement, interest, and performances can further increase picking efficiency.

Thus, to the extent that the robots interact with human operators, the robots can be configured to present gamification of the picking process to further engage the operator and to prevent or reduce performance draining symptoms such as boredom, cognitive disengagement, fatigue, and haste-induced error.

Provided herein are methods and systems for robot gamification for improvement of operator performance.

In one aspect the invention features a method for improving operator performance by robot gamification. The method includes parking a robot at a pose location within a navigational space. The method also includes identifying, by a sensor in electronic communication with an interactive display device, an operator located within a zone proximate the robot for acquiring an item to be picked. The method also includes receiving, at the interactive display device, operator performance data associated with the acquiring of the item. The method also includes rendering, on the interactive display device in response to the received operator performance data, at least one graphic representation of operator achievement within a gamified performance tracking environment.

In some embodiments, the step of identifying also includes reading, by the sensor, an ID tag of the operator. In some embodiments, the ID tag is at least one of a passive RFID tag, an active RFID tag, a Bluetooth transceiver, or a near field communications (NFC) beacon. In some embodiments, the sensor is at least one of an RFID reader, a Bluetooth transceiver, or a NFC transceiver. In some embodiments, the step of identifying also includes capturing, by the sensor, a facial image of the operator. In some embodiments, the step of identifying also includes comparing the captured facial image to an image recognition database. In some embodiments, the sensor is at least one of a digital camera, a digital video camera, an image sensor, a charge coupled device (CCD), or a CMOS sensor. In some embodiments, the step of identifying also includes capturing, by the sensor, at least one of a voiceprint of the operator, a retinal pattern of the operator, or a fingerprint pattern of the operator. In some embodiments, the step of identifying also includes comparing the captured at least one of a voiceprint of the operator, a retinal pattern of the operator, or a fingerprint pattern of the operator to a corresponding user identification database. In some embodiments, the sensor is at least one of an imaging device, a camera, a video camera, an audio sensor, a retinal scanner, a fingerprint scanner, an infrared scanner, a barcode scanner, or a RFID reader.

In some embodiments, the step of rendering also includes displaying at least one badge on the interactive display device. In some embodiments, the at least one badge is rendered in response to a milestone achieved by the operator. In some embodiments, the milestone includes at least one of a predefined number of units picked by the operator, a predefined pick rate of the operator, a predefined number of units picked within the navigational space, a predefined aggregated pick rate within the navigational space, or a predefined number of units picked without scanning an erroneous unit. In some embodiments, the step of rendering also includes displaying at least one performance meter on the interactive display device. In some embodiments, the performance meter is configured to indicate performance of the operator relative to a performance goal or standard. In some embodiments, the performance goal or standard includes at least one of a predefined number of units picked by the operator, a predefined pick rate of the operator, a predefined number of units picked within the navigational space, a predefined aggregated pick rate within the navigational space, or a predefined number of units picked without scanning an erroneous unit. In some embodiments, the performance meter is at least one of a virtual dial meter, a color coded illumination area, a segmented bar meter, or a solid bar meter. In some embodiments, the step of rendering also includes displaying at least one ranking chart on the interactive display device. In some embodiments, the ranking chart is configured to indicate performance of the operator relative to one or more other operators with respect to a competitive metric. In some embodiments, the performance goal or standard includes at least one of fastest average time between pick tasks, fastest average time to complete a pick task, pick rate, consecutive days of operator attendance, consecutive units picked without scanning an erroneous item, or most robots interacted with in a day.

In another aspect the invention features a system for improving operator performance by robot gamification. The system includes a robot parked at a pose location within a navigational space. The system also includes an interactive display device in electronic communication with the robot. The system also includes a sensor in electronic communication with the interactive display device. The interactive display device includes a processor. The interactive display device also includes a memory storing instructions that, when executed by the processor, cause the interactive display device to identify an operator located within a zone proximate the robot for acquiring an item to be picked. The interactive display device also includes a memory storing instructions that, when executed by the processor, cause the interactive display device to receive operator performance data associated with the acquiring of the item. The interactive display device also includes a memory storing instructions that, when executed by the processor, cause the interactive display device to render, on the interactive display device in response to the received operator performance data, at least one graphic representation of operator achievement within a gamified performance tracking environment.

These and other features of the invention will be apparent from the following detailed description and the accompanying figures, in which:

BRIEF DESCRIPTION OF THE FIGURES

FIG. 6 is a table of the fiducial identification to pose mapping;

FIG. 7 is a table of the bin location to fiducial identification mapping;

DETAILED DESCRIPTION OF INVENTION

Figure 1:
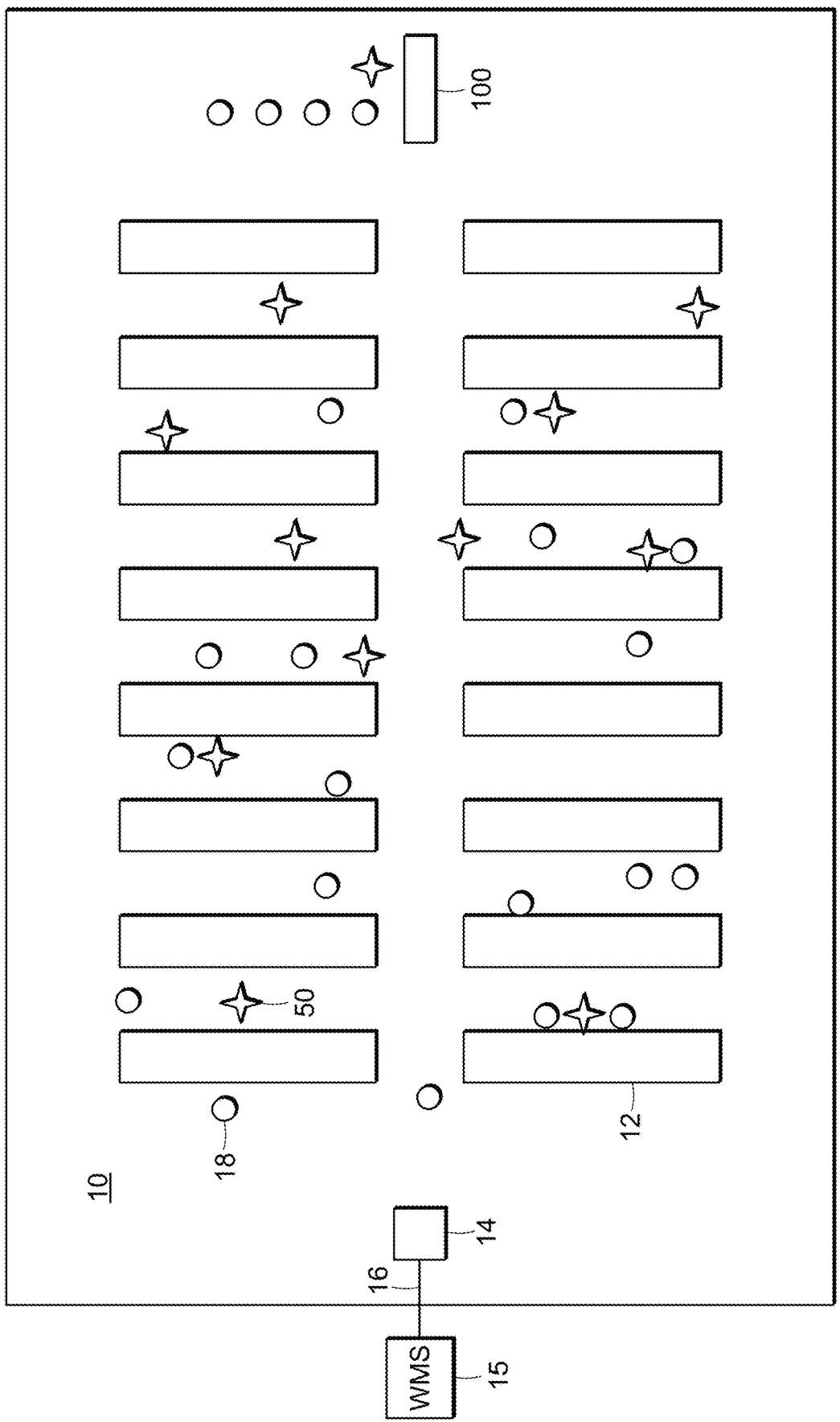
FIG. 1 is a top plan view of an order-fulfillment warehouse.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The invention is directed to robot gamification for improved operator performance. Although not restricted to any particular robot application, one suitable application that the invention may be used in is order fulfillment. The use of robots in this application will be described to provide context for the zone engine but is not limited to that application.

Referring to FIG. 1, a typical order-fulfillment warehouse 10 includes shelves 12 filled with the various items that could be included in an order. In operation, an incoming stream of orders 16 from warehouse management system 15 arrive at an order-server 14. The order-server 14 may prioritize and group orders, among other things, for assignment to robots 18 during an induction process. As the robots are inducted by operators, at a processing station (e.g. station 100), the orders 16 are assigned and communicated to robots 18 wirelessly for execution. It will be understood by those skilled in the art that order server 14 may be a separate server with a discrete software system configured to interoperate with the warehouse management system server 15 and warehouse management software or the order server functionality may be integrated into the warehouse management software and run on the warehouse management system 15.

Figure 2A:
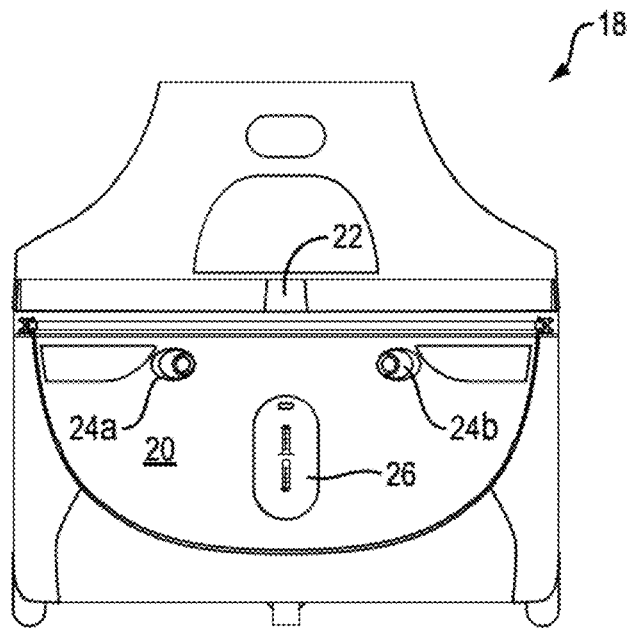
FIG. 2A is a front elevational view of a base of one of the robots used in the warehouse shown in FIG. 1.
Figure 2B:
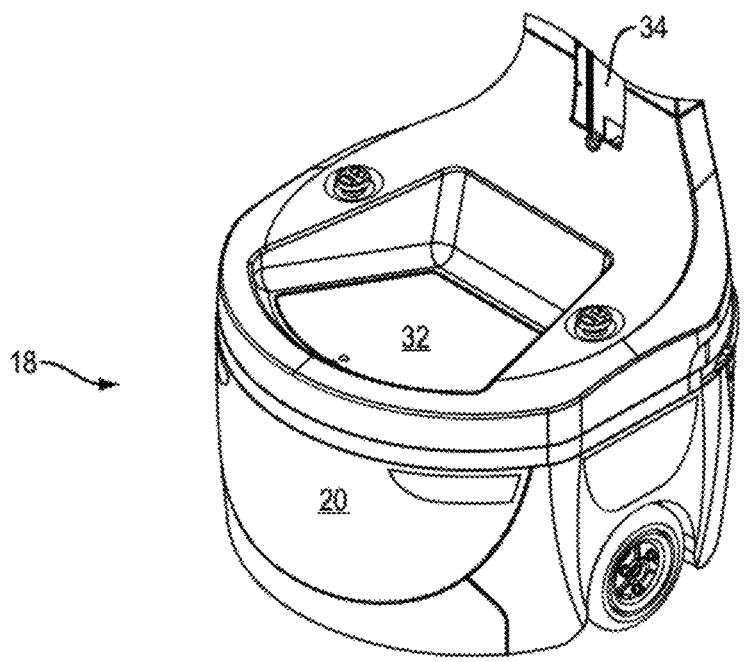
FIG. 2B is a perspective view of a base of one of the robots used in the warehouse shown in FIG. 1.
Figure 3:
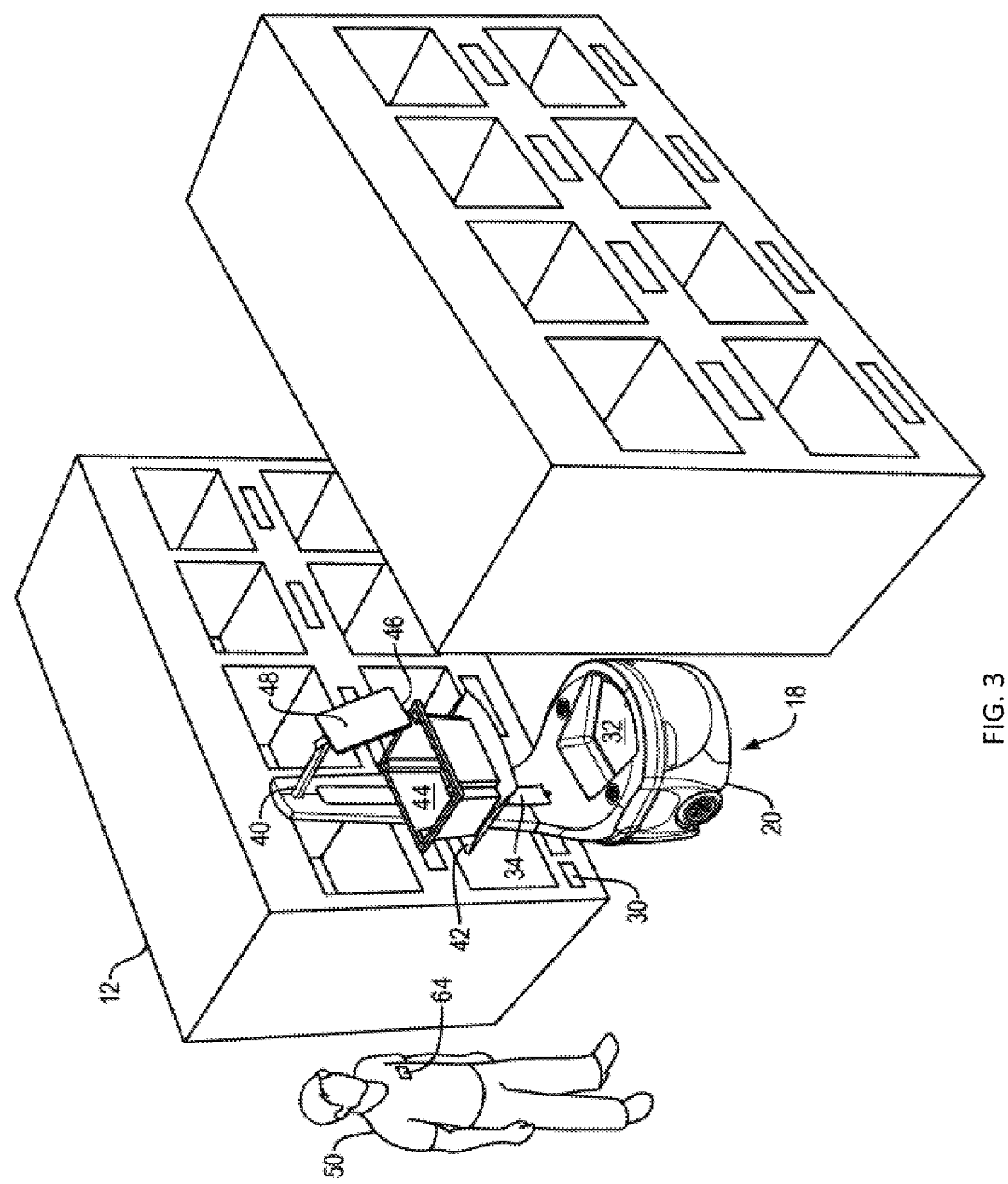
FIG. 3 is a perspective view of the robot in FIGS. 2A and 2B outfitted with an armature and parked in front of a shelf shown in FIG. 1.

In a preferred embodiment, a robot 18, shown in FIGS. 2A and 2B, includes an autonomous wheeled base 20 having a laser-radar 22. The base 20 also features a transceiver (not shown) that enables the robot 18 to receive instructions from and transmit data to the order-server 14 and/or other robots, and a pair of digital optical cameras 24a and 24b. The robot base also includes an electrical charging port 26 for recharging the batteries which power autonomous wheeled base 20. The base 20 further features a processor (not shown) that receives data from the laser-radar and cameras 24a and 24b to capture information representative of the robot's environment. There is a memory (not shown) that operates with the processor to carry out various tasks associated with navigation within the warehouse 10, as well as to navigate to fiducial marker 30 placed on shelves 12, as shown in FIG. 3. Fiducial marker 30 (e.g. a two-dimensional bar code) corresponds to bin/location of an item ordered. The navigation approach of this invention is described in detail below with respect to FIGS. 4-8. Fiducial markers are also used to identify charging stations and the navigation to such charging station fiducial markers is the same as the navigation to the bin/location of items ordered. Once the robots navigate to a charging station, a more precise navigation approach is used to dock the robot with the charging station.

Referring again to FIG. 2B, base 20 includes an upper surface 32 where a tote or bin could be stored to carry items. There is also shown a coupling 34 that engages any one of a plurality of interchangeable armatures 40, one of which is shown in FIG. 3. The particular armature 40 in FIG. 3 features a tote-holder 42 (in this case a shelf) for carrying a tote 44 that receives items, and a tablet holder 46 (or laptop/other user input device) for supporting a tablet 48. In some embodiments, the armature 40 supports one or more totes for carrying items. In other embodiments, the base 20 supports one or more totes for carrying received items. As used herein, the term "tote" includes, without limitation, cargo holders, bins, cages, shelves, rods from which items can be hung, caddies, crates, racks, stands, trestle, containers, boxes, canisters, vessels, and repositories.

With current robot technology, quickly and efficiently picking items from a shelf and placing them in the tote 44 is technically challenging due to functional difficulties associated with robotic manipulation of objects. Thus, currently, a more efficient way of picking items is to use a local operator 50, which is typically human, to carry out the task of physically removing an ordered item from a shelf 12 and placing it on robot 18, for example, in tote 44. The robot 18 communicates the order to the local operator 50 via the tablet 48 (or laptop/other user input device), which the local operator 50 can read, or by transmitting the order to a handheld device used by the local operator 50.

Upon receiving an order 16 from the order server 14, the robot 18 proceeds to a first warehouse location, e.g. as shown in FIG. 3. It does so based on navigation software stored in the memory and carried out by the processor. The navigation software relies on data concerning the environment, as collected by the laser-radar 22, an internal table in memory that identifies the fiducial identification ("ID") of fiducial marker 30 that corresponds to a location in the warehouse 10 where a particular item can be found, and the cameras 24a and 24b to navigate.

Upon reaching the correct location (pose), the robot 18 parks itself in front of a shelf 12 on which the item is stored and waits for a local operator 50 to retrieve the item from the shelf 12 and place it in tote 44. If robot 18 has other items to retrieve it proceeds to those locations. The item(s) retrieved by robot 18 are then delivered to a processing station 100, FIG. 1, where they are packed and shipped. While processing station 100 has been described with regard to this figure as being capable of inducting and unloading/packing robots, it may be configured such that robots are either inducted or unloaded/packed at a station, i.e. they may be restricted to performing a single function.

It will be understood by those skilled in the art that each robot may be fulfilling one or more orders and each order may consist of one or more items. Typically, some form of route optimization software would be included to increase efficiency, but this is beyond the scope of this invention and is therefore not described herein.

In order to simplify the description of the invention, a single robot 18 and operator 50 are described. However, as is evident from FIG. 1, a typical fulfillment operation includes many robots and operators working among each other in the warehouse to fill a continuous stream of orders.

The baseline navigation approach of this invention, as well as the semantic mapping of a SKU of an item to be retrieved to a fiducial ID/pose associated with a fiducial marker in the warehouse where the item is located, is described in detail below with respect to FIGS. 4-8.

Using one or more robots 18, a map of the warehouse 10 must be created and the location of various fiducial markers dispersed throughout the warehouse must be determined. To do this, one or more of the robots 18 as they are navigating the warehouse they are building/updating a map 10a, FIG. 4, utilizing its laser-radar 22 and simultaneous localization and mapping (SLAM), which is a computational problem of constructing or updating a map of an unknown environment. Popular SLAM approximate solution methods include the particle filter and extended Kalman filter. The SLAM GMapping approach is the preferred approach, but any suitable SLAM approach can be used.

Robot 18 utilizes its laser-radar 22 to create map 10a of warehouse 10 as robot 18 travels throughout the space identifying, open space 112, walls 114, objects 116, and other static obstacles, such as shelf 12, in the space, based on the reflections it receives as the laser-radar scans the environment.

Figure 4:
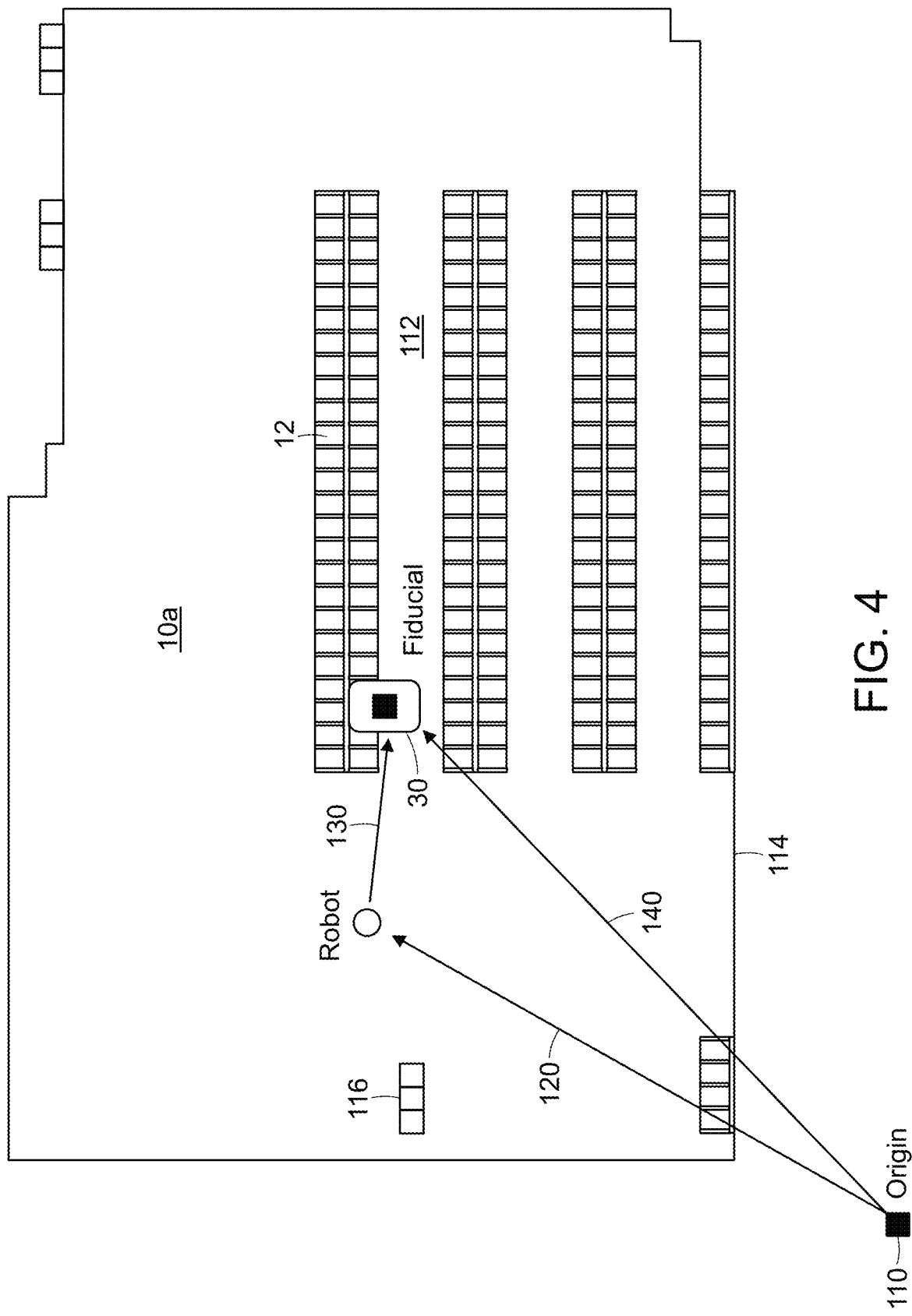
FIG. 4 is a partial map of the warehouse of FIG. 1 created using laser radar on the robot.

While constructing the map 10a (or updating it thereafter), one or more robots 18 navigates through warehouse 10 using camera 26 to scan the environment to locate fiducial markers (two-dimensional bar codes) dispersed throughout the warehouse on shelves proximate bins, such as 32 and 34, FIG. 3, in which items are stored. Robots 18 use a known starting point or origin for reference, such as origin 110. When a fiducial marker, such as fiducial marker 30, FIGS. 3 and 4, is located by robot 18 using its camera 26, the location in the warehouse relative to origin 110 is determined.

By the use of wheel encoders and heading sensors, vector 120, and the robot's position in the warehouse 10 can be determined. Using the captured image of a fiducial marker/two-dimensional barcode and its known size, robot 18 can determine the orientation with respect to and distance from the robot of the fiducial marker/two-dimensional barcode, vector 130. With vectors 120 and 130 known, vector 140, between origin 110 and fiducial marker 30, can be determined. From vector 140 and the determined orientation of the fiducial marker/two-dimensional barcode relative to robot 18, the pose (position and orientation) defined by a quaternion (x, y, z, w) for fiducial marker 30 can be determined.

Figure 5:
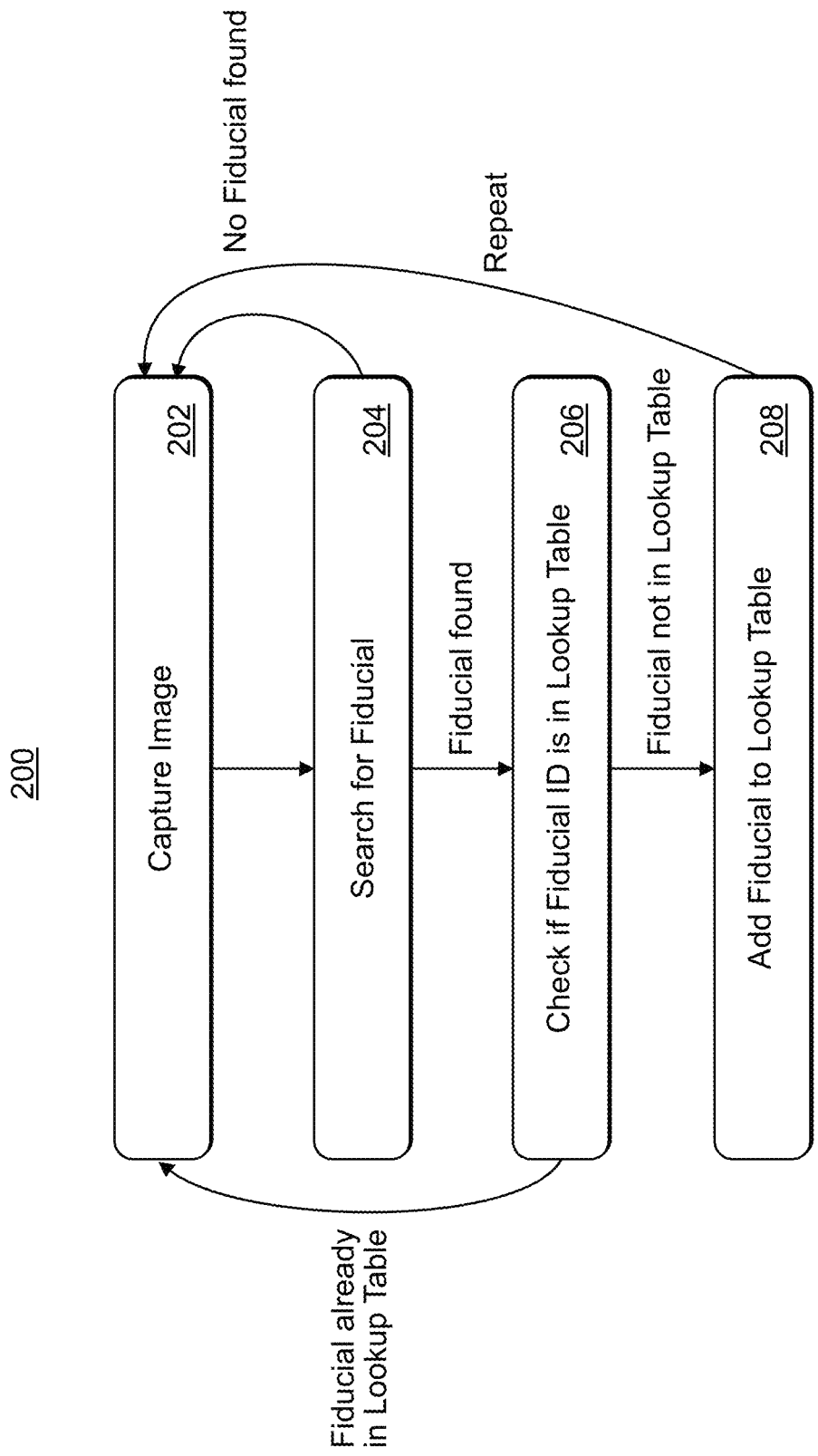
FIG. 5 is a flow chart depicting the process for locating fiducial markers dispersed throughout the warehouse and storing fiducial marker poses.

Flow chart 200, FIG. 5, describing the fiducial marker location process is described. This is performed in an initial mapping mode and as robot 18 encounters new fiducial markers in the warehouse while performing picking, placing and/or other tasks. In step 202, robot 18 using camera 26 captures an image and in step 204 searches for fiducial markers within the captured images. In step 206, if a fiducial marker is found in the image (step 204) it is determined if the fiducial marker is already stored in fiducial table 300, FIG. 6, which is located in memory 34 of robot 18. If the fiducial information is stored in memory already, the flow chart returns to step 202 to capture another image. If it is not in memory, the pose is determined according to the process described above and in step 208, it is added to fiducial to pose lookup table 300.

In look-up table 300, which may be stored in the memory of each robot, there are included for each fiducial marker a fiducial identification, 1, 2, 3, etc., and a pose for the fiducial marker/bar code associated with each fiducial identification. The pose consists of the x,y,z coordinates in the warehouse along with the orientation or the quaternion (x,y,z, ω).

In another look-up Table 400, FIG. 7, which may also be stored in the memory of each robot, is a listing of bin locations (e.g. 402a-f) within warehouse 10, which are correlated to particular fiducial ID's 404, e.g. number "11". The bin locations, in this example, consist of seven alpha-numeric characters. The first six characters (e.g. L01001) pertain to the shelf location within the warehouse and the last character (e.g. A-F) identifies the particular bin at the shelf location. In this example, there are six different bin locations associated with fiducial ID "11". There may be one or more bins associated with each fiducial ID/marker.

The alpha-numeric bin locations are understandable to humans, e.g. operator 50, FIG. 3, as corresponding to a physical location in the warehouse 10 where items are stored. However, they do not have meaning to robot 18. By mapping the locations to fiducial s, Robot 18 can determine the pose of the fiducial ID using the information in table 300, FIG. 6, and then navigate to the pose, as described herein.

Figure 8:
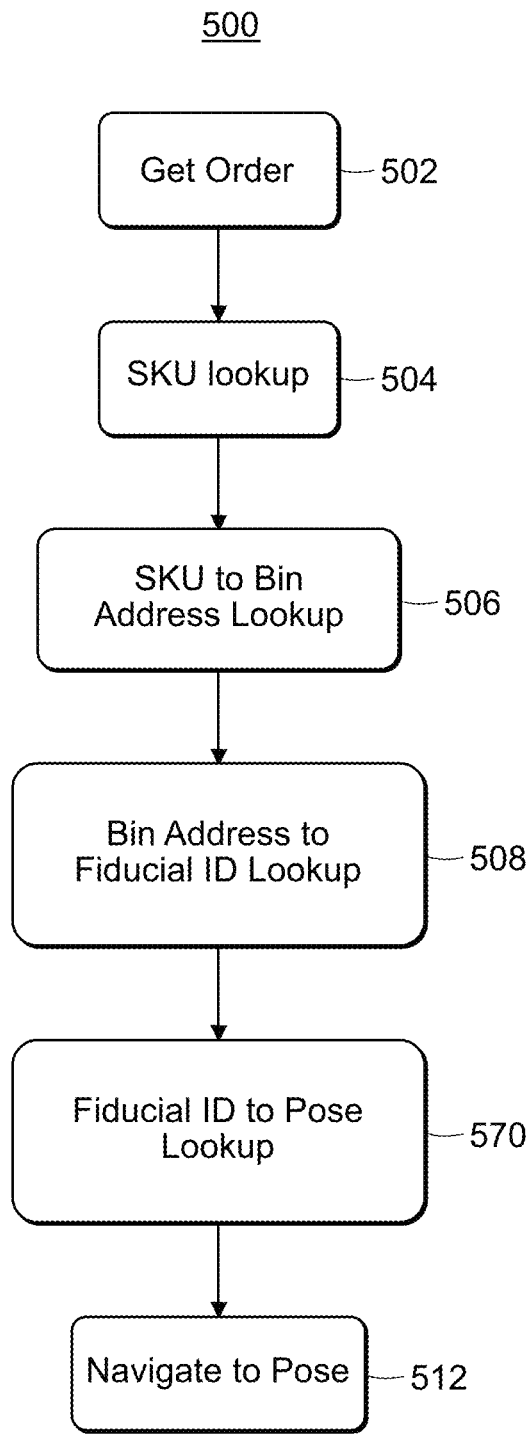
FIG. 8 is a flow chart depicting product SKU to pose mapping process.

The order fulfillment process according to this invention is depicted in flow chart 500, FIG. 8. In step 502, from warehouse management system 15, order server 14 obtains an order, which may consist of one or more items to be retrieved. It should be noted that the order assignment process is fairly complex and goes beyond the scope of this disclosure. One such order assignment process is described in commonly owned U.S. patent application Ser. No. 15/807,672, entitled Order Grouping in Warehouse Order Fulfillment Operations, filed on Sep. 1, 2016, which is incorporated herein by reference in its entirety. It should also be noted that robots may have tote arrays which allow a single robot to execute multiple orders, one per bin or compartment. Examples of such tote arrays are described in U.S. patent application Ser. No. 15/254,321, entitled Item Storage Array for Mobile Base in Robot Assisted Order-Fulfillment Operations, filed on Sep. 1, 2016, which is incorporated herein by reference in its entirety.

Continuing to refer to FIG. 8, in step 504 the SKU number(s) of the items is/are determined by the warehouse management system 15, and from the SKU number(s), the bin location(s) is/are determined in step 506. A list of bin locations for the order is then transmitted to robot 18. In step 508, robot 18 correlates the bin locations to fiducial ID's and from the fiducial ID's, the pose of each fiducial ID is obtained in step 510. In step 512 the robot 18 navigates to the pose as shown in FIG. 3, where an operator can pick the item to be retrieved from the appropriate bin and place it on the robot.

Item specific information, such as SKU number and bin location, obtained by the warehouse management system 15/order server 14, can be transmitted to tablet 48 on robot 18 so that the operator 50 can be informed of the particular items to be retrieved when the robot arrives at each fiducial marker location.

With the SLAM map and the pose of the fiducial ID's known, robot 18 can readily navigate to any one of the fiducial ID's using various robot navigation techniques. The preferred approach involves setting an initial route to the fiducial marker pose given the knowledge of the open space 112 in the warehouse 10 and the walls 114, shelves (such as shelf 12) and other obstacles 116. As the robot begins to traverse the warehouse using its laser radar 26, it determines if there are any obstacles in its path, either fixed or dynamic, such as other robots 18 and/or operators 50, and iteratively updates its path to the pose of the fiducial marker. The robot re-plans its route about once every 50 milliseconds, constantly searching for the most efficient and effective path while avoiding obstacles.

With the product SKU/fiducial ID to fiducial pose mapping technique combined with the SLAM navigation technique both described herein, robots 18 are able to very efficiently and effectively navigate the warehouse space without having to use more complex navigation approaches typically used which involve grid lines and intermediate fiducial markers to determine location within the warehouse.

Operator Identification and Performance Tracking

Figure 9:
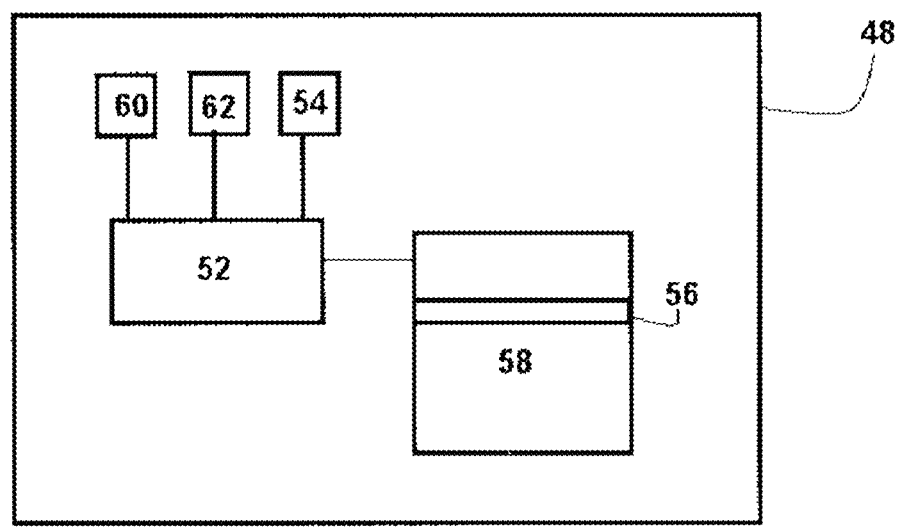
FIG. 9 is a block diagram illustrating an architecture of a tablet of the robot shown in FIG. 3.
Figure 10:
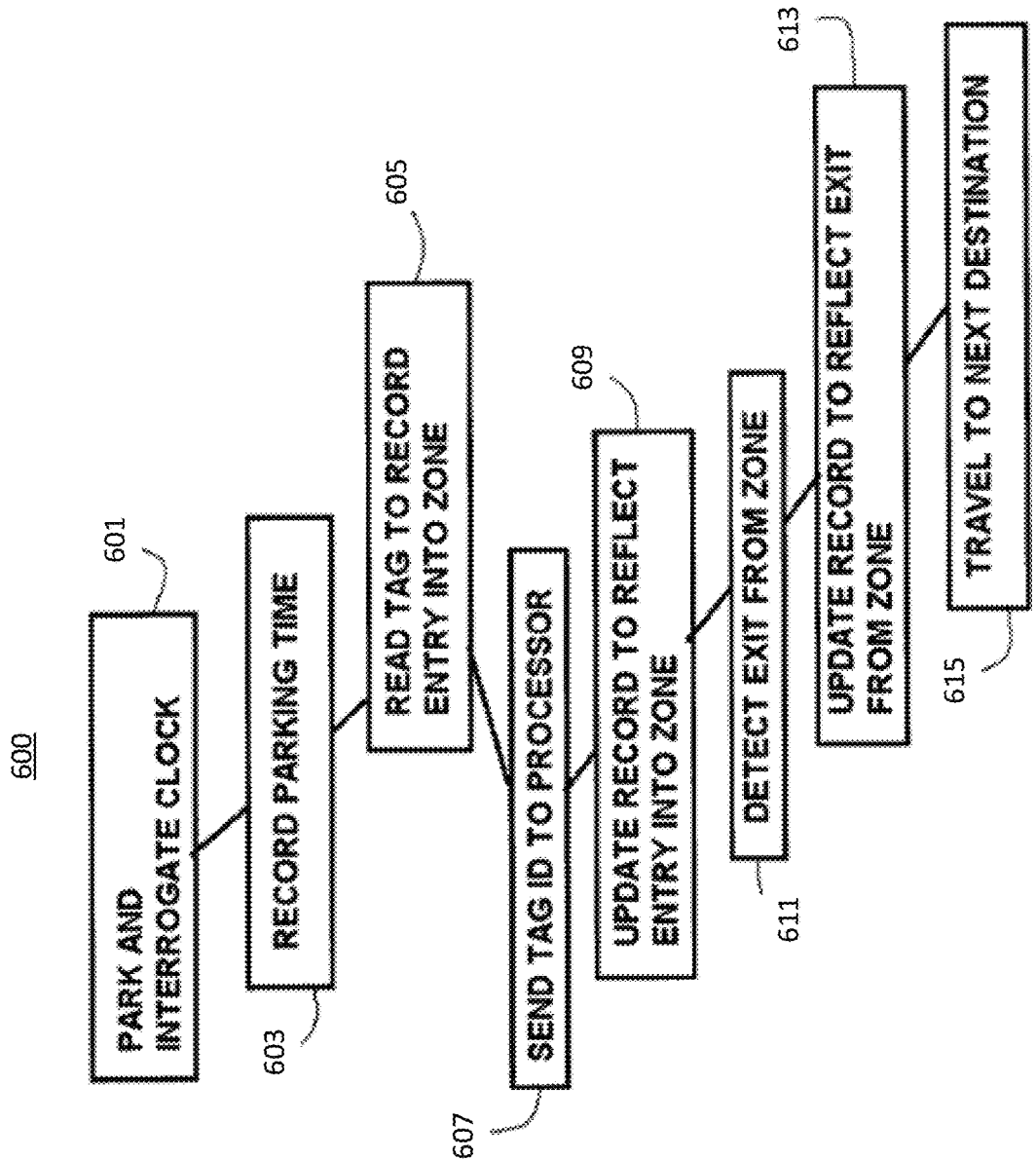
FIG. 10 is a flow-chart of a procedure executed by the tablet shown in FIG. 9.

As explained above, typically, upon reaching the correct location (pose), the robot 18 parks itself in front of a shelf 12 on which the item is stored and waits for a local operator 50 to retrieve the item from the shelf 12 and place it in tote 44. Referring now to FIGS. 9 and 10, for each picking interaction between the robot 18 and the local operator 50, the robot 18 can be configured to identify the local operator 50 and track picking performance associated with the picking interaction.

In particular, once the robot 18 is parked at the correct pose location proximate the fiducial 30, the robot 18 can interrogate a database-clock of a database in communication with the robot 18 to determine the time at which the robot 18 parked at the pose proximate the fiducial marker 30 (step 601 of method 600 of FIG. 10). The robot can then create a record in the database of the arrival time at the pose (step 603). In some embodiments, instead of interrogating the database-clock, the robot 18 may cause a database-timer to start counting time. In either case, the goal is to determine how long the robot 18 is kept waiting.

In some embodiments, the database in communication with the robot 18 can be a remote standalone database. In some embodiments, the database can be incorporated into a memory of the WMS 15 or the order-server 14. In some embodiments, the database can be incorporated into the tablet 48. In such embodiments a tablet-processor 52 can then interrogate a tablet-clock 54 to determine the time at which robot 18 parked at the pose proximate the fiducial marker 30 (step 601 of method 600 of FIG. 10). The tablet-processor 52 can then create a record 56 in a tablet-memory 58 of the arrival time at the pose (step 603). In some embodiments, instead of interrogating a tablet-clock 54, the tablet-processor 52 may instead cause a tablet-timer 60 to start counting time.

In general, after the robot 18 is parked at the pose, the local operator 50 will see the robot 18 and walk toward it. The local operator 50 then inspects the tablet 48 to determine which item should be retrieved, retrieves the item from the shelf 12, and places it on robot 18, for example, into the tote 44. In some embodiments, upon completion of the picking task, when the item has been placed on the robot 18, the robot 18 can re-interrogate the database-clock or stop the database-timer to determine a dwell time spent at each pose.

In some embodiments, the robot 18 can include a proximity sensor 62. In some embodiments, the proximity sensor 62 can be configured to detect any local operator 50 approaching the robot 18. As further shown in FIG. 3, upon entry of the local operator 50 into a proximity zone 66 surrounding the robot 18, the proximity sensor 62 can detect a tag 64 carried or worn by the local operator 50 (step 605). Such tags 64 can include active or passive RFID tags, Bluetooth devices, near-field communications (NFC) devices; cellphones, smartphones, or any other suitable devices.

Referring again to FIGS. 9 and 10, to the extent that the local operator 50 is carrying the tag 64, the proximity sensor 62 then communicates the information concerning the tag 64 to the database (step 607). The database then updates the record to document identification information associated with the tag 64. If desired, the robot can also record a time at which the local operator 50 entered the zone (step 609).

The local operator 50 then inspects the tablet 48 to learn which item or items should be picked. Alternatively, the robot 18 (e.g., via tablet 48) can transmit information concerning an item to be picked to a handheld device used by the local operator 50. The local operator 50 then retrieves the item or items from the shelf 12 and places the item or items into the tote 44, at which point the robot 18 indicates task completion and either re-interrogates the database-clock or stops the database-timer to determine dwell time of the robot 18 at that pose. The local operator 50 then leaves the zone 66.

In some embodiments, the pose location of the robot 18 can be positioned such that the local operator 50 does not have to leave the zone 66 to retrieve the item. To that end, and more generally, the size of zone 66 can vary depending on the particular application. For example, in some embodiments the zone 66 can be approximately one to two meters in diameter centered on the location of robot 18.

If desired, the proximity sensor 62 can detect the departure of the local operator 50 (and, if applicable, the accompanying tag 64) from the zone 66 (step 611) and update the record 56 to reflect the time of departure (step 613). After the local operator 50 leaves the zone 66, the robot 18 then moves on to its next destination (step 615), which could be another shelf 12 or a packing station for check-out.

Figure 11:
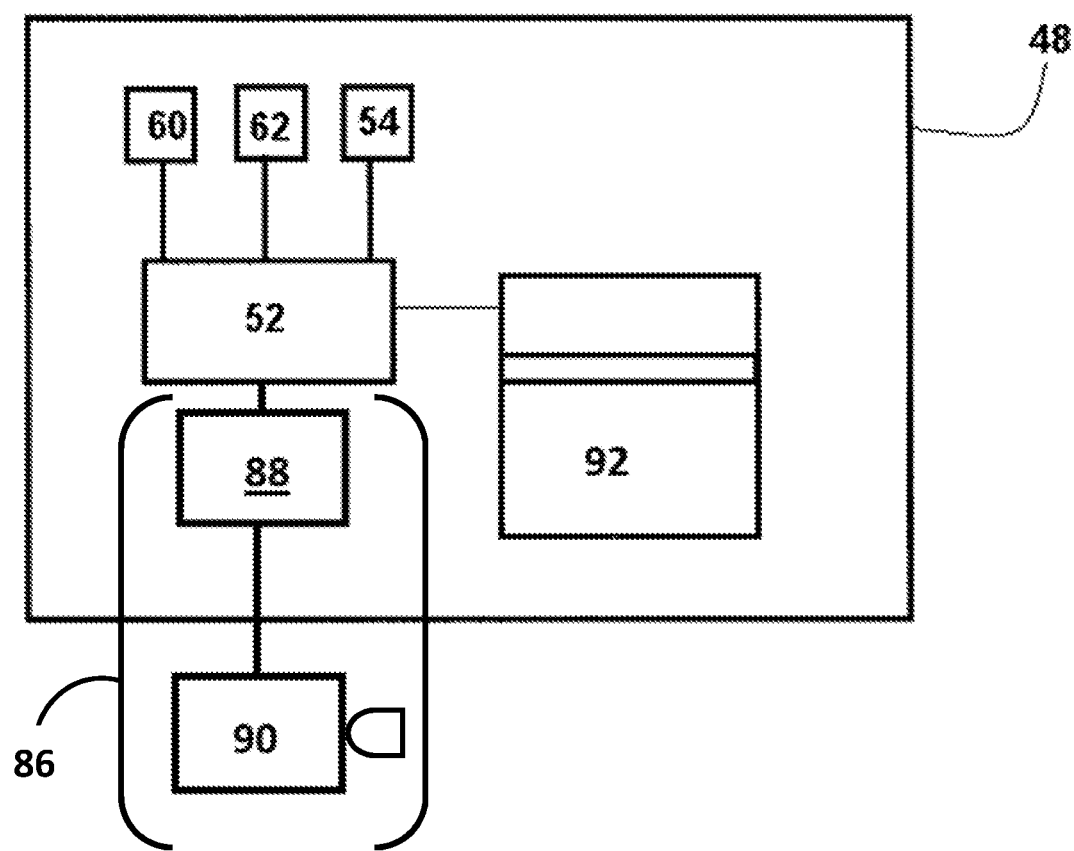
FIG. 11 is a block diagram illustrating an architecture of an alternative tablet of the robot shown in FIG. 3.

In other embodiments, shown in FIG. 11, the local operator 50 does not need to carry an identifying tag 64 for the robot 48 to detect the local operator 50 within the zone 66. Instead, the tablet 48 is coupled to an on-board identification system 86. For example, as shown in FIG. 11, the on-board identification system 86 includes an identification system 88 configured to receive identifying information from a user recognition device 90 and further configured to consult an identification database 92 to identify the local operator 50. For example, in some embodiments, the user recognition device 90 can include one or more of an imaging device (e.g., having an image sensor such as a charge coupled device (CCD) or a CMOS sensor), a camera, a video camera, an audio sensor, a retinal scanner, a fingerprint scanner, an infrared scanner, a barcode scanner, or combinations thereof.

In some embodiments, the identification database 92 can include a facial recognition database, a retinal database, a voice pattern database, a fingerprint database, a barcode database, or combinations thereof.

Regardless of the local operator identification methodology, the robot 18 can associate the pick and any associated local operator performance data to a corresponding local operator ID and/or local operator account. The data collected by the tablet 48 can then be transmitted to the warehouse management system 15 and/or the order-server 14 either in real time as it is acquired or periodically for association with local operator performance data stored in association with the local operator ID/account. The data thus collected provides a basis for tracking, incentivizing, and potentially rewarding performance of the local operator 50 as well as any other local operators that have interacted with the robot 18.

In addition to evaluating performance, data collected by the tablet 48, in particular, local operator identification data, can be used by warehouse management system 15 for security purposes to determine if local operator 50 is an authorized local operator, is authorized to operate in a particular region of the warehouse, or for a particular local operator. Moreover, the identification data can be used to set preferences for local operator 50, such as language used by tablet 48.

On a system wide basis, data corresponding to a plurality of interactions between a plurality of robots 18 and a plurality of local operators 50 (e.g., as in a warehouse having a fleet of robots 18 each interacting with a plurality of warehouse picker local operators 50 throughout various locations within the warehouse). Thus, for example, all of the other robots 18, as depicted in FIG. 1, also collect data from operators 50 with which they interact and transmit the data to management server 84. This data is thus available to management to discourage an otherwise unsupervised local operator 50 from performing poorly or, conversely, to provide a basis for rewarding a local operator 50 for performing well.

The data collected by robot 18 and transmitted to warehouse management system 15 indicative of local operator activity includes information regarding one or more of the following: the amount of time for an operator to enter the zone 66 after the robot 18 arrives at the pose, the amount of time operator 50 takes to exit zone 66 after the operator enters the zone, and the amount of time the operator 50 takes to perform a defined function, such as picking an item from shelf 12 and placing on the robot 18 or picking an item from robot 18 and placing it on shelf 12.

By use of such data, the warehouse management system 15 can be configured to track local operator efficiency based at least in part on the information collected indicative of local operator activity. The management server 15 may be configured to maintain warehouse statistics based at least in part on this information. Operator efficiency and other statistics collected/computed may be may be used as an incentive to increase operator performance or in other ways by management. For example, to the extent that a particular pose is associated with abnormally long time for operators to perform a picking function, abnormally long time between operator entry and exit from the zone 66, or abnormally long time between arrival at the pose and operator entry of the zone 66, the management server 15 and/or order-server 14 can update the pose location to improve proximity to the corresponding shelf locations and/or to improve robot visibility.

Robot Gamification

As explained above, due to the repetitive, high paced nature of warehouse picking, human operators such as local operator 50 can be susceptible to boredom, cognitive disengagement, fatigue, and haste-induced error, thereby negatively impacting picking efficiency and overall warehouse output. In order to reduce and prevent such symptoms, in some embodiments, gamification of the robots 18 can be implemented to cognitively engage operators 50, reward operators 50 for achievements, and to provide competition between operators 50. In particular, gamification serves to improve awareness of operator performance in real-time, to encourage users to perform to a high level and provide potential for incentives.

Figure 12:
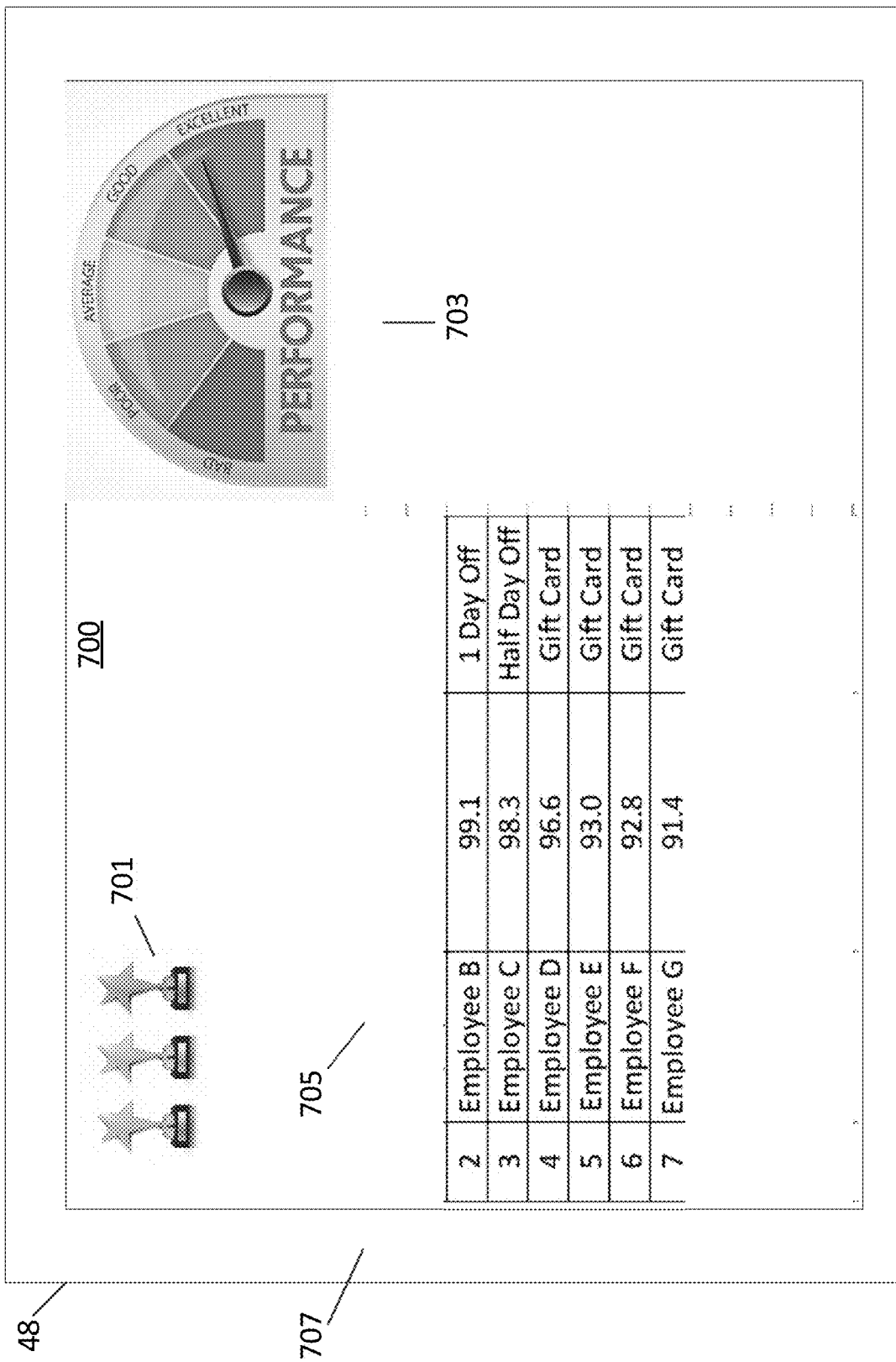
FIG. 12 is a diagram illustrating an example gamification display rendered on the tablet of the robot shown in FIG. 3.

As shown in FIG. 12, the gamification, in some embodiments, can be presented to the operator 50 at least partially via a display 700 of the tablet 48. In particular, as shown for example in FIG. 12, the display 700 can include one or more indicators of current employee performance corresponding to the operator 50. Such performance indicators can include, for example, badges 701, a performance meter 703, a ranking (horse race) chart 705, a color coded illumination portion 707, or combinations thereof. It will further be apparent that the display 700 elements shown in FIG. 12 are for illustrative purposes only and that additional text data, numerical data, alternative graphics, or other gamification related objects can be provided to the operator in some embodiments. For example, the operator 50, in some embodiments, can query one or more of an all-time highest pick rate (units per hour) achieved by any operator in the facility, an all-time highest pick rate achieved by the operator 50, a highest pick rate achieved by any operator 50 in the facility for a day, a week, a month, a quarter, a year, or any other temporal window, a highest pick rate achieved by the operator for a day, a week, a month, a quarter, a year, or any other temporal window, a highest number of units picked by any operator in the facility in an hour, a day, a week, a month, a quarter, a year, or any other temporal window, a highest number of units picked by the operator 50 in an hour, a day, a week, a month, a quarter, a year, or any other temporal window, average operator 50 pick rate, all time number of units picked by the operator 50, average pick rate of all operators, total units picked in the facility by all operators, whether all-time or in a day, a week, a month, a quarter, a year, or any other temporal window, average aggregate pick rate in the facility of all operators, whether all-time or in a day, a week, a month, a quarter, a year, or any other temporal window, or any other suitable performance data. Although many of the performance data described above is measured with respect to the general term "units" picked, it will be apparent in view of this disclosure that the term "units", as used herein, unless otherwise indicated, can refer to actual individual picked product units, to a number of order lines picked, to a number of total orders picked, or to any other suitable quantifier for assessing pick volume.

The badges 701, in some embodiments, can be awarded to the operator 50 upon achievement of one or more milestones. Milestones can include, for example, a number of units picked (e.g., 1,000, 10,000, 100,000, 1,000,000, or any other number of units) by the operator 50 or the facility as a whole, one of the operator 50 or the facility as a whole maintaining a predefined pick rate for one or more predetermined time periods, achievement of a personal best pick rate by the operator 50 or by the facility as a whole, perfect attendance by the operator 50, conducting error free picking (e.g., not picking an erroneous item) by one of the operator 50 or the facility as a whole for a predetermined amount of time, or any other suitable milestones or achievements.

The performance meter 703, in some embodiments, can indicate operator 50 performance relative to one or more of operator-specific goals or standards, facility wide goals or standards, peer performance, or combinations thereof. For example, a user may have a target pick rate of 80 U/hr (units per hour), which can be associated with an indication of average or middle performance (e.g., "AVERAGE" on the performance meter 703 shown in FIG. 12). The performance meter 703 can then, based on the operator's 50 actual pick rate, indicate whether the performance is "BAD", "POOR", "AVERAGE", "GOOD", or "EXCELLENT". For example, in some embodiments, BAD can be any pick rate less than 65 U/hr, POOR can be any pick rate between 65 to 75 U/hr, AVERAGE can be any pick rate between 75 to 85 U/hr, GOOD can be any pick rate between 85 to 95 U/hr, and EXCELLENT can be any pick rate greater than 95 U/hr. However will be apparent in view of this disclosure that the performance meter 703 can be any suitable graphic (e.g., a dial meter as shown, a segmented bar, a solid bar, or any other suitable graphic) and can include color, grayscale, text, images, or any number and combination thereof to convey a performance status of the operator 50. It will be further apparent in view of this disclosure that, although shown as including five performance categories, labeled as "BAD", "POOR", "AVERAGE", "GOOD", and "EXCELLENT", the performance meter 703 can have any number of segments, categories, other performance indicators, or combinations thereof and that those segments, categories, other performance indicators, or combinations thereof can be unlabeled or labeled with any suitable label desired.

Similar to the performance meter 703, the color coded illumination portion 707 can also be used to indicate performance of an operator 50 and/or the facility as a whole (or a subset thereof). In particular, rather than a dial meter graphic as shown with respect to performance meter 703, the color coded illumination portion 707 can change color relative to the performance being measured. For example, to indicate "BAD" performance, the illumination portion can turn red, to indicate "POOR" performance, the illumination portion can turn orange, to indicate "AVERAGE" performance, the illumination portion can turn yellow, to indicate "GOOD" performance, the illumination portion can turn yellow-green, or to indicate "EXCELLENT" performance, the illumination portion can turn green. However, it will be apparent in view of this disclosure that any number of categories and/or colors can be used in accordance with various embodiments.

The ranking chart or "horse race" 705 can be configured to indicate, in real time, a ranking of a predetermined number of operators with respect to a particular competitive metric. For example, as shown in FIG. 12, the ranking chart 705 is displayed as a table indicating, for the top 10 operators and the current operator 50, the operator name, each operator's performance with respect to the competitive metric (e.g., pick rate as shown), and, optionally, a prize or message associated with each operator's ranking. As shown in FIG. 12, the operator 50 is ranked outside the top 10 because the operator's 50 pick rate is lower than Employees A-J.

Although depicted as a table, it will be apparent in view of this disclosure that the ranking chart or "horse race" 705 can be configured in any suitable graphic such as, for example, a horizontal bar chart, a virtual horse race graphic, a running race graphic, an automobile race graphic, a list, any other suitable graphic, or combinations thereof. It will further be apparent in view of this disclosure that, although shown as correlating to pick rate in FIG. 12, the competitive metric can be associated with any suitable operator performance data outcomes such as, for example, fastest average time between pick tasks (i.e. time between completing one pick task at a first robot and the commencement of another pick task at another robot or the same robot), fastest average time to complete a pick task (i.e. time between commencement and completion of a pick task at a robot), pick rate, consecutive days attendance, consecutive units picked without scanning an erroneous item, most robots interacted with in a day, or any other suitable metric.

The robot gamification can further provide a reward/award mechanism for recognizing operator achievements. As shown in FIG. 12, the Employees A-J ranked in the top 10 on the ranking chart 705 (in the horse race) can be provided with a reward, award, or encouraging message (coaching) according to their respective ranks. Alternatively, being ranked for a particular hour, shift, day, week, month, quarter, or year can provide the operator 50 with an allocated number of reward points, which can be later redeemed for, for example, paid time off, gift cards, products, compensatory bonuses, 401k or HSA contributions, etc. At the facility-wide or company-wide level, the competition can be between multiple business units, warehouse facilities, or geographical regions. In such embodiments the awards can include, for example, company funded recognition events, parties, or offsite outings, More generally, points, rewards, awards, and coaching can be provided in response to any gamification-related outcome such as, for example, achieving milestones, receiving badges, being ranked, or any other gamification-related outcome.

Although described herein as being displayed on a tablet 48 of the robot 18, it will be apparent in view of this disclosure that gamification data and outcomes can be displayed on any suitable device including a display. For example, the horse race ranking chart 705, in some embodiments, can be presented on one or more large displays located in and around the warehouse so that operators and employees can track the real time updates to the rankings without needing to query a robot 18. Additionally, in some embodiments, the robot 18 and/or tablet 48 may be in communication with a handheld or wearable device (e.g., a mobile phone, smart watch, augmented reality glasses, handheld scanner, other suitable devices, or combinations thereof), which can be used to display or otherwise communicate (e.g., via audio messages) gamification data and outcomes to the operator 50.

Non-Limiting Example Computing Devices

Figure 13:
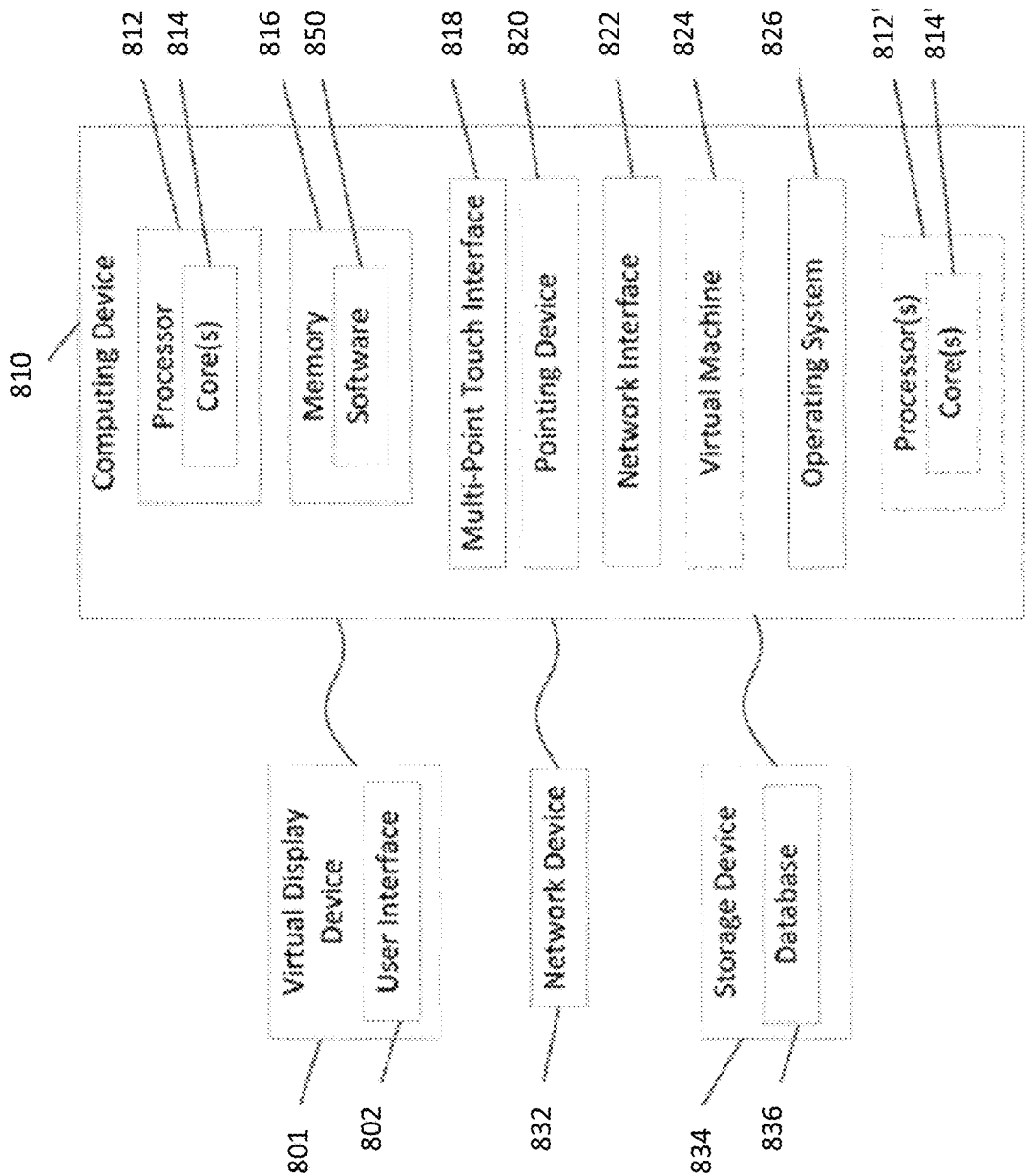
FIG. 13 is a block diagram of an exemplary computing system implemented in the robot of FIG. 3.

FIG. 13 is a block diagram of an exemplary computing device 810 such as can be used, or portions thereof, in accordance with various embodiments as described above with reference to FIGS. 1-12. The computing device 810 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 816 included in the computing device 810 can store computer-readable and computer-executable instructions or software for performing the operations disclosed herein. For example, the memory can store software application 840 which is programmed to perform various of the disclosed operations as discussed with respect to FIGS. 1-12. The computing device 810 can also include configurable and/or programmable processor 812 and associated core 814, and optionally, one or more additional configurable and/or programmable processing devices, e.g., processor(s) 812' and associated core (s) 814' (for example, in the case of computational devices having multiple processors/cores), for executing computer-readable and computer-executable instructions or software stored in the memory 816 and other programs for controlling system hardware. Processor 812 and processor(s) 812' can each be a single core processor or multiple core (814 and 814') processor.

Virtualization can be employed in the computing device 810 so that infrastructure and resources in the computing device can be shared dynamically. A virtual machine 824 can be provided to handle a process running on multiple processors so that the process appears to be using only one computing resource rather than multiple computing resources. Multiple virtual machines can also be used with one processor.

Memory 816 can include a computational device memory or random access memory, such as but not limited to DRAM, SRAM, EDO RAM, and the like. Memory 816 can include other types of memory as well, or combinations thereof.

A user can interact with the computing device 810 through a visual display device 801, such as a computer monitor, which can display one or more user interfaces 802 that can be provided in accordance with exemplary embodiments. The computing device 810 can include other I/O devices for receiving input from a user, for example, a keyboard or any suitable multi-point touch interface 818, a pointing device 820 (e.g., a mouse). The keyboard 818 and the pointing device 820 can be coupled to the visual display device 801. The computing device 810 can include other suitable conventional I/O peripherals.

The computing device 810 can also include one or more storage devices 834, such as but not limited to a hard-drive, CD-ROM, or other computer readable media, for storing data and computer-readable instructions and/or software that perform operations disclosed herein. Exemplary storage device 834 can also store one or more databases for storing any suitable information required to implement exemplary embodiments. The databases can be updated manually or automatically at any suitable time to add, delete, and/or update one or more items in the databases.

The computing device 810 can include a network interface 822 configured to interface via one or more network devices 832 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 822 can include a built-in network adapter, network interface card, PCMCIA network card, card bus network adapter, wireless network adapter, USB network adapter, modem or any other device suitable for interfacing the computing device 810 to any type of network capable of communication and performing the operations described herein. Moreover, the computing device 810 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 810 can run any operating system 826, such as, for example, any of the versions of the Microsoft® Windows® operating systems (Microsoft, Redmond, Wash.), the different releases of the Unix and Linux operating systems, any version of the MAC OS® (Apple, Inc., Cupertino, Calif.) operating system, any version of the iOS® (Apple, Inc., Cupertino, Calif.) operating system, any version of the Android® (Google, Inc., Mountain View, Calif.) operating system, any embedded operating system, any real-time operating system, any open source operating system, any proprietary operating system, or any other operating system capable of running on the computing device and performing the operations described herein. In exemplary embodiments, the operating system 826 can be run in native mode or emulated mode. In an exemplary embodiment, the operating system 826 can be run on one or more cloud machine instances.

Figure 14:
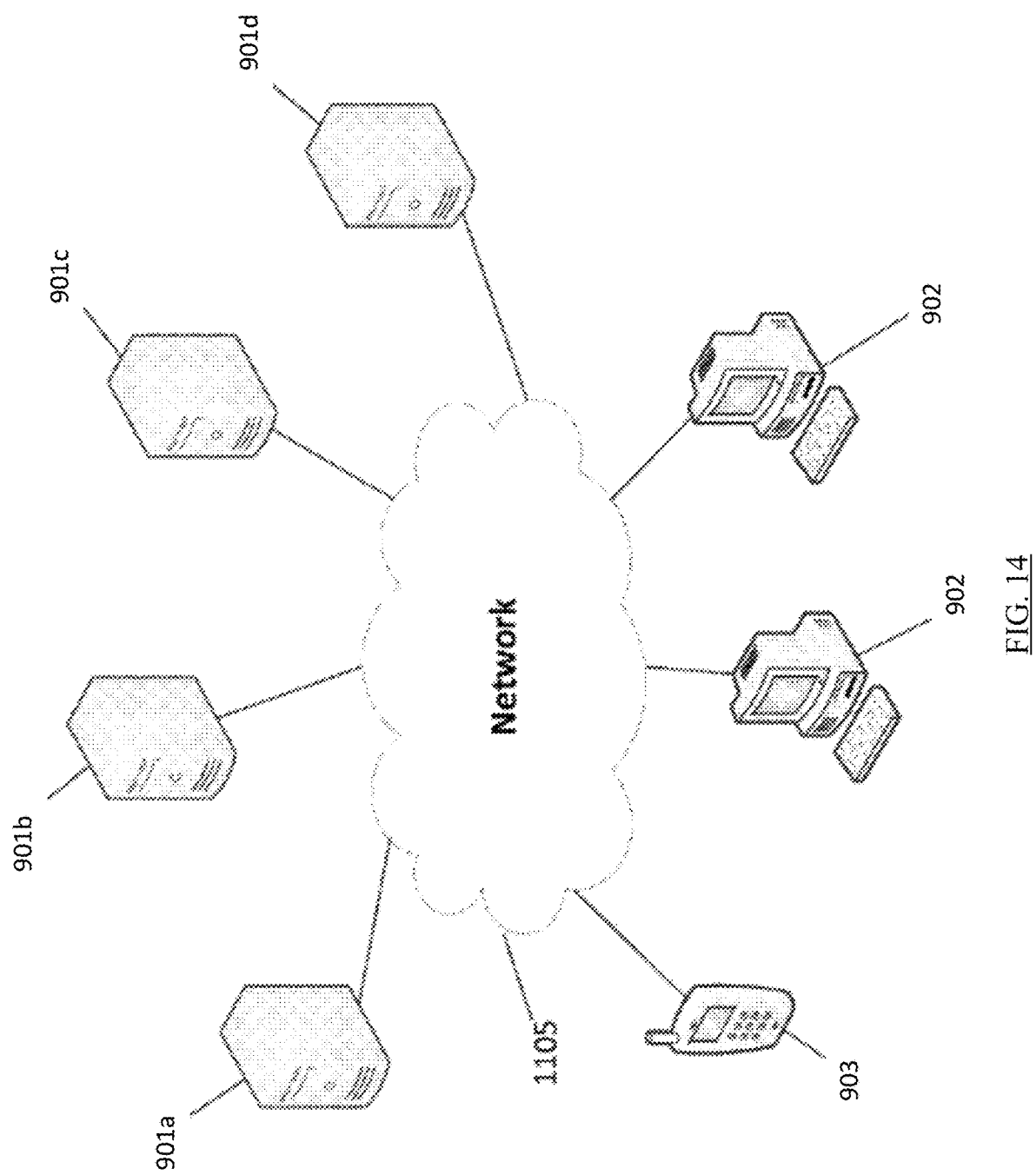
FIG. 14 is a network diagram of an exemplary distributed network which may be utilized in a warehouse operation described herein.

FIG. 14 is an example computational device block diagram of certain distributed embodiments. Although FIGS. 1-12, and portions of the exemplary discussion above, make reference to a warehouse management system 15 and an order-server 14 each operating on an individual or common computing device, one will recognize that any one of the warehouse management system 15, the order-server 14, and/or the zone server may instead be distributed across a network 905 in separate server systems 901*a-d* and possibly in user systems, such as kiosk, desktop computer device 902, or mobile computer device 903. For example, the order-server 14 and/or the zone server may be distributed amongst the tablets 48 of the robots 18. In some distributed systems, modules of any one or more of the warehouse management system software, the order-server software, and the zone engine can be separately located on server systems 901*a-d* and can be in communication with one another across the network 905.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto. The invention is therefore not limited by the above described embodiments and examples.

What is claimed is:

1. A method for improving operator performance by robot gamification comprising:
    parking a robot at a pose location within a navigational space;
    identifying, by a sensor in electronic communication with an interactive display device, an operator located within a zone proximate the robot for acquiring an item to be picked;
    receiving, at the interactive display device, operator performance data associated with the acquiring of the item; and
    rendering, on the interactive display device in response to the received operator performance data, at least one graphic representation of operator achievement within a gamified performance tracking environment; wherein the operator achievement includes at least one of a predefined number of units picked by the operator, a predefined pick rate of the operator, a predefined number of units picked within the navigational space, a predefined aggregated pick rate within the navigational space, or a predefined number of units picked without scanning an erroneous unit.

2. The method of claim 1, wherein the step of identifying further comprises:
    reading, by the sensor, an ID tag of the operator.

3. The method of claim 2, wherein the ID tag is at least one of a passive RFID tag, an active RFID tag, a Bluetooth transceiver, or a near field communications (NFC) beacon.

4. The method of claim 2, wherein the sensor is at least one of an RFID reader, a Bluetooth transceiver, or a NFC transceiver.

5. The method of claim 1, wherein the step of identifying further comprises:
    capturing, by the sensor, a facial image of the operator; and
    comparing the captured facial image to an image recognition database.

6. The method of claim 5, wherein the sensor is at least one of a digital camera, a digital video camera, an image sensor, a charge coupled device (CCD), or a CMOS sensor.

7. The method of claim 1, wherein the step of identifying further comprises:
    capturing, by the sensor, at least one of a voiceprint of the operator, a retinal pattern of the operator, or a fingerprint pattern of the operator; and
    comparing the captured at least one of a voiceprint of the operator, a retinal pattern of the operator, or a fingerprint pattern of the operator to a corresponding user identification database.

8. The method of claim 1, wherein the sensor is at least one of an imaging device, a camera, a video camera, an audio sensor, a retinal scanner, a fingerprint scanner, an infrared scanner, a barcode scanner, or a RFID reader.

9. The method of claim 1, wherein the at least one graphic representation comprises at least one badge.

10. The method of claim 1, wherein the at least one graphic representation comprises at least one performance meter.

11. The method of claim 10, wherein the performance meter is at least one of a virtual dial meter, a color coded illumination area, a segmented bar meter, or a solid bar meter.

12. The method of claim 1, wherein the step of rendering further comprises:
    displaying at least one ranking chart on the interactive display device.

13. The method of claim 12, wherein the ranking chart is configured to indicate performance of the operator relative to one or more other operators with respect to a competitive metric.

14. The method of claim 13, wherein the competitive metric includes at least one of fastest average time between pick tasks, fastest average time to complete a pick task, pick rate, consecutive days of operator attendance, consecutive units picked without scanning an erroneous item, or most robots interacted with in a day.

15. A system for improving operator performance by robot gamification comprising:
    a robot parked at a pose location within a navigational space;
    an interactive display device in electronic communication with the robot; and a sensor in electronic communication with the interactive display device, wherein the interactive display device includes:
 a processor; and
 a memory storing instructions that, when executed by the processor, cause the interactive display device to:
  identify an operator located within a zone proximate the robot for acquiring an item to be picked;
  receive operator performance data associated with the acquiring of the item; and
  render, on the interactive display device in response to the received operator performance data, at least one graphic representation of operator achievement within a gamified performance tracking environment; wherein the operator achievement includes at least one of a predefined number of units picked by the operator, a predefined pick rate of the operator, a predefined number of units picked within the navigational space, a predefined aggregated pick rate within the navigational space, or a predefined number of units picked without scanning an erroneous unit.

* * * * *